United States Patent [19]

Gräfenschnell

[11] 4,338,533
[45] Jul. 6, 1982

[54] ELECTRIC MACHINE EXCITED BY PERMANENT MAGNETS

[75] Inventor: Horst Gräfenschnell, Bad Neustadt, Fed. Rep. of Germany

[73] Assignee: Siemens Aktiengesellschaft, Munich, Fed. Rep. of Germany

[21] Appl. No.: 935,101

[22] Filed: Aug. 21, 1978

[30] Foreign Application Priority Data

Aug. 24, 1977 [DE] Fed. Rep. of Germany ....... 2738175

[51] Int. Cl.³ .......................................... H02K 21/26
[52] U.S. Cl. .................................... 310/154; 310/258
[58] Field of Search .............. 310/152, 154, 155, 179, 310/260, 254, 85, 86, 258, 259, 89

[56] References Cited

U.S. PATENT DOCUMENTS

| 3,083,310 | 3/1963 | Tweedy | 310/154 |
| 3,487,457 | 12/1969 | Drouard | 310/86 |
| 3,564,705 | 12/1967 | Cochardt | 310/154 |
| 3,609,420 | 9/1971 | Inagaki | 310/86 |
| 3,631,277 | 12/1971 | Ferdig | 310/154 |
| 3,663,850 | 5/1972 | Phelon | 310/154 |

FOREIGN PATENT DOCUMENTS

| 110672 | 5/1964 | Czechoslovakia | 310/154 |
| 1160080 | 12/1963 | Fed. Rep. of Germany | 310/154 |
| 1924473 | 11/1970 | Fed. Rep. of Germany | 310/154 |
| 2342499 | 3/1975 | Fed. Rep. of Germany | 310/154 |
| 2442288 | 4/1975 | Fed. Rep. of Germany | 310/154 |
| 417355 | of 1947 | Italy | 310/154 |

*Primary Examiner*—R. Skudy
*Attorney, Agent, or Firm*—Kenyon & Kenyon

[57] ABSTRACT

An electric machine without pole pieces excited by permanent magnets is disclosed in which the stator of the machine comprises a yoke frame of angular outside shape having an even number of corners which exceeds 2 and of circular inside shape. The yoke frame forms the magnetic return and arc-shaped permanent magnets corresponding to the inside shape of the yoke frame are fastened in the inside of the yoke frame with lateral spaces therebetween, the magnets being centrally disposed between respective corners of the frame.

4 Claims, 2 Drawing Figures

ELECTRIC MACHINE EXCITED BY PERMANENT MAGNETS

BACKGROUND OF THE INVENTION

The present invention relates to an electric machine excited by permanent magnets, and more particularly to such a machine in which the stator comprises a yoke frame forming the magnetic return with permanent magnets being secured to the inside of the yoke frame.

In German Auslegeschrift No. 1 160 080 is disclosed a machine in which flat magnet slabs, on which pole pieces are placed for concentrating the magnetic flux, are fastened to a yoke frame of angular inside and outside shape. The pole pieces project toward the rotor of the machine and are rounded at least partially to correspond to the diameter of the rotor. These pole pieces must be made in a separate operation and also must be assembled subsequently in the stator of the machine.

SUMMARY OF THE INVENTION

It is an object of the present invention to provide an electric machine excited by permanent magnets which has a simplified design and is simply assembled.

It is another object of the present invention to provide an electric machine excited by permanent magnets without pole pieces.

It is still another object of the present invention to increase the power rating of a machine without increasing its size.

These and other objects of the present invention are achieved by providing a permanent magnet excited electric machine in which the inside of the yoke frame is of circular shape and the permanent magnets are correspondingly shaped and fastened along the inside of the yoke frame. The outside shape of the yoke frame is angular having an even number of vertices or corners greater than two and, in accordance with the invention, the permanent magnets are arranged along the inside of the yoke frame intermediate two respective corners of the outside of the yoke frame.

In accordance with the invention, the yoke frame and the permanent magnets are designed and the geometric shape of the permanent magnets configured so that the flux is sufficiently concentrated and directed to dispense with pole pieces. In addition to the advantages gained by elimination of the pole pieces themselves, there is also the advantage that elimination of the pole pieces provides a machine having a larger rotor diameter with the same external dimensions whereby the power rating of the machine is increased.

Due to the circular shape of the inside of the yoke frame, the yoke frame has a large cross section at its respective corners, which decreases to a minimum towards the center of the yoke frame sides between respective corners. Because the permanent magnets are arranged between two respective corners of the yoke frame, the shape of the flux density corresponds to the cross section of the yoke frame in which the highest flux density always occurs at the corners of the yoke frame where the largest cross section is available as well. In the central part of the yoke frame sides between two corners, the flux density is reduced substantially to zero. Therefore, the small cross section of the yoke frame in the central part between two corners is fully adequate for this reduced flux density. The inside diameter of the yoke frame can thereby be chosen correspondingly large and the thickness of the yoke frame in the central part between two corner is ultimately determined only by the mechanical strength required. Such a large diameter leads to an increase of the power of the machine, as described.

According to one embodiment of the invention, securing of the permanent magnets is achieved by fastening them in the stator by holding bars inserted into lateral spaces between two respective permanent magnets with a ring disposed on each of the end faces of the stator connecting the holding bars to each other. Assembly of the machine is simplified by inserting a tube of amagnetic material into the stator bore formed by the permanent magnets and making the holding bars, as well as the rings connecting them, by a diecasting process.

These and other aspects of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENT

Figure 1:
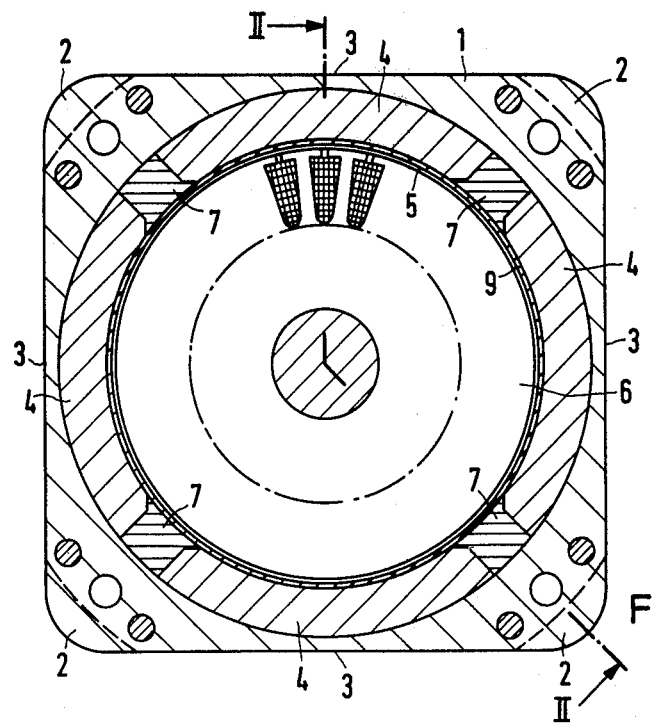
FIG. 1 is a cross section view of the electric machine according to the invention.
Figure 2:
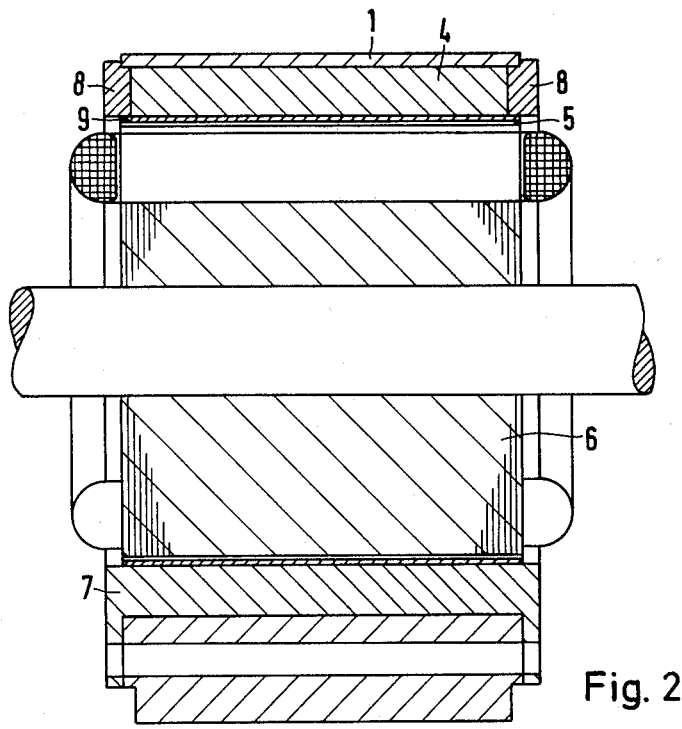
FIG. 2 is a longitudinal section of the machine of FIG. 1 taken along line II—II thereof.

Referring now more particularly to the drawings, yoke frame 1 of the machine according to the invention consists of ferromagnetic material and has a square outside shape and a circular inside shape. This geometrical shape provides the yoke frame 1 with a large cross section at its four corners 2. The cross section decreases to a minimum toward the center 3 of each outer yoke side. Arc-shaped permanent magnets 4 are fastened to the inside of the yoke frame 1. The permanent magnets 4 are arranged in the yoke frame in such a manner that they are located in the center between two respective corners, i.e., the center of the permanent magnets 4 coincides with the center 3 of the outer yoke sides. The arc-shaped permanent magnets 4 form a stator bore 5, in which the rotor 6 of the machine is rotatably supported. The permanent magnets 4 are arranged with lateral spacing between them. Thus, a space is obtained between each two permanent magnets 4 and a holding bar 7 is inserted into each of these spaces. The individual holding bars 7 are connected to each other by rings 8 provided on the end faces of the stator and thus form a holding frame for the permanent magnets 4. In the stator bore 5 is disposed a thin tube 9 of amagnetic material, for example, brass, which closes the spaces between two permanent magnets 4 on the side of the stator bore 5. This permits holding bars 7 to be fabricated together with the rings 8 by a diecasting process. The tube 9, in addition, secures the permanent magnets 4, if the magnets develop cracks when the holding bars 7 are injected. The holding bars 7 are advantageously made of aluminum, as thereby good heat removal from the rotor to the yoke frame is obtained.

Due to the circular shape of the inside of the yoke frame, it is possible to arrange arc-shaped permanent magnets 4, in which the flux is sufficiently concentrated toward the rotor because of the geometrical shape. The pole pieces necessary in the known machines can therefore be eliminated. The space gained thereby in the radial direction can be utilized for increasing the rotor diameter.

Due to the fact that the permanent magnets are arranged in the middle between two respective corners of the yoke frame, the highest flux density always occurs in the region of the corners 2 of the yoke frame. Since at this point, due to the geometrical shape of the yoke frame (angular outside contour, circular inside contour), the largest cross section occurs anyhow, the diameter of the circular aperture of the yoke frame 1 can be chosen so large that in the vicinity of the center 3 of the outer side of the yoke frame 1 only a narrow bridge is left which is determined by the strength of the yoke frame.

Thus, a maximum rotor diameter in accordance with the invention is obtained by the described arrangement of the permanent magnets 4 and circular inside contour of the yoke frame for given outside dimensions of the yoke frame. The enlarged rotor diameter results in an increase of the power rating. The machine can therefore be built with the same outside dimensions for higher power than in the known machine. On the other hand, the dimensions can be reduced correspondingly for the same power.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention wherein chosen for the purposes of the disclosure without departing from the spirit and scope of the invention.

What is claimed is:

1. A permanent magnet excited electric machine including a stator which comprises:
    a yoke frame of angular outside shape in which the number of corners thereof is even and greater than two and of circular inside shape, said yoke frame forming the magnetic return, and
    a plurality of laterally spaced, arc-shaped permanent magnets secured to the inside of the yoke frame, each being disposed generally centered with respect to two adjacent corners.

2. The machine as recited in claim 1, and comprising a plurality of holding bars and at least one ring connecting the bars, the spaced magnets defining lateral spaces therebetween with the bars being disposed in the lateral spaces between the magnets, the bars in cooperation with the ring connecting the bars, securing the magnets in the inside of the yoke frame.

3. The machine as recited in claim 2, and including a tube of a magnetic material disposed in the stator bore of the machine formed by the magnets, with the bars and the rings connecting them being of unitary, one piece construction and being disposed about the tube.

4. The machine as recited in claim 1, wherein the number of arc-shaped permanent magnets corresponds to the number of corners of said yoke frame.

* * * * *